United States Patent [19]

Gannett et al.

[11] Patent Number: 4,576,857

[45] Date of Patent: Mar. 18, 1986

[54] MELT-FUSIBLE POLYIMIDES

[75] Inventors: Thomas P. Gannett; Hugh H. Gibbs, both of Wilmington, Del.

[73] Assignee: E. I. Du Pont de Nemours and Company, Wilmington, Del.

[21] Appl. No.: 534,208

[22] Filed: Sep. 21, 1983

Related U.S. Application Data

[63] Continuation-in-part of Ser. No. 475,034, Mar. 14, 1983, abandoned.

[51] Int. Cl.$^4$ ............... B32B 27/28; C07C 93/14; C07C 149/42; C08G 73/10
[52] U.S. Cl. .................... 428/260; 156/53; 174/110 SR; 244/119; 427/96; 427/117; 428/271; 428/272; 428/273; 428/280; 428/290; 428/294; 428/407; 428/408; 428/473.5; 428/698; 428/901; 428/902; 524/104; 524/173; 524/233; 524/361; 524/378; 524/379; 524/445; 524/449; 528/183; 528/353; 564/430
[58] Field of Search ............... 528/183, 353; 524/104, 524/173, 237, 361, 378, 381, 445, 449, 379; 428/260, 271, 272, 273, 280, 290, 294, 407, 408, 473.5, 698, 902; 564/430

[56] References Cited

U.S. PATENT DOCUMENTS

| | | |
|---|---|---|
| 3,234,181 | 2/1966 | Olivier . |
| 3,845,018 | 10/1974 | Bilow et al. . |
| 3,914,310 | 10/1975 | Frick et al. ............... 564/430 |
| 3,944,575 | 3/1976 | Villaecusa et al. ............... 564/430 |
| 3,959,350 | 5/1976 | Rogers . |
| 3,988,374 | 10/1976 | Brode et al. ............... 564/430 |
| 4,017,459 | 4/1977 | Ouder . |
| 4,196,144 | 4/1980 | Darms ............... 564/430 |
| 4,239,880 | 12/1980 | Darms ............... 564/430 |
| 4,336,175 | 6/1982 | Gibbs . |

FOREIGN PATENT DOCUMENTS 1542768  3/1979  United Kingdom .

OTHER PUBLICATIONS

Sazanov et al, *Visokomolekulyarnie Soedineniya*, (B) 20, 820–824 (1978), No. 11. .
Sachindrapal, et al, Makromol. Chem., Rapid Commun., 1, 667–670 (1980).

*Primary Examiner*—James C. Cannon
*Attorney, Agent, or Firm*—P. R. Steyermark

[57] ABSTRACT

Melt-fusible polyimides based on pyromellitic dianhydride and at least one defined aromatic diamine are useful in making low-void composites and thermoplastic tapes, which can be fabricated into articles such as, for example, aircraft and autobody panels, printed circuit boards, etc. Some of these polyimides are melt-processible and can be fabricated by conventional procedures such as extrusion and injection molding.

44 Claims, No Drawings

MELT-FUSIBLE POLYIMIDES

CROSS REFERENCE TO RELATED APPLICATION

This is a continuation-in-part of our application Ser. No. 475,034 filed Mar. 14, 1983, now abandoned.

BACKGROUND OF THE INVENTION

This invention relates to certain melt-fusible polyimides, especially to those which can be melt processed without deleterious decomposition.

For the purpose of the present disclosure and claims, the term "melt-fusible" means that the material can be heated without significant decomposition above its glass transition temperature (Tg), if it is amorphous, or above its crystalline melting point (Tm), if it has crystallinity, and coalesced under pressure. The term "melt processible" means that the material can be fabricated by conventional melt processing techniques such as extrusion and injection molding, in which the melt passes through an orifice. While all the polyimides of the present invention are melt-fusible, the melt viscosity of some polyimides may be so high that they will not be readily melt processable. But even those high viscosity materials are capable of being formed into useful void-free articles by other techniques, such as, for example, fusion in situ on a support or in a heated mold under pressure.

Polyimides are condensation type polymers having a repeating unit of the type shown in Formula (A), below:

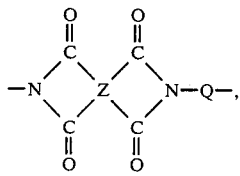

(A)

where Z is a suitable tetravalent organic radical, which may be a simple structure such as that derived from the benzene ring or a more complex structure such as that derived from benzophenone, or any other appropriate, usually aromatic, tetravalent radical; and Q is a divalent organic radical.

One of the important industrial applications of polyimides is as binders for advanced composite materials, especially for use in the aerospace industry; e.g., in aircraft fuselages, wings, flight control surfaces, and missile nose cones, etc. The usual manner of making sheets of composite materials based on polyimides involves impregnation of a fibrous substrate, such as a woven or nonwoven fabric, with a solution of either the polyimide itself or one or more polyimide precursors and then either simply evaporating the solvent or forming a high molecular weight polyimide in situ. Such in situ polyimide formation, which usually is conducted at an elevated temperature, often is referred to as "curing". This expression will be used throughout the present disclosure in the same sense. The polyimide usually is made from the dianhydride of a suitable tetracarboxylic acid in one of two ways, as shown below in equations (1) and (2) for one pathway and (I), (II), and (III) for the other pathway

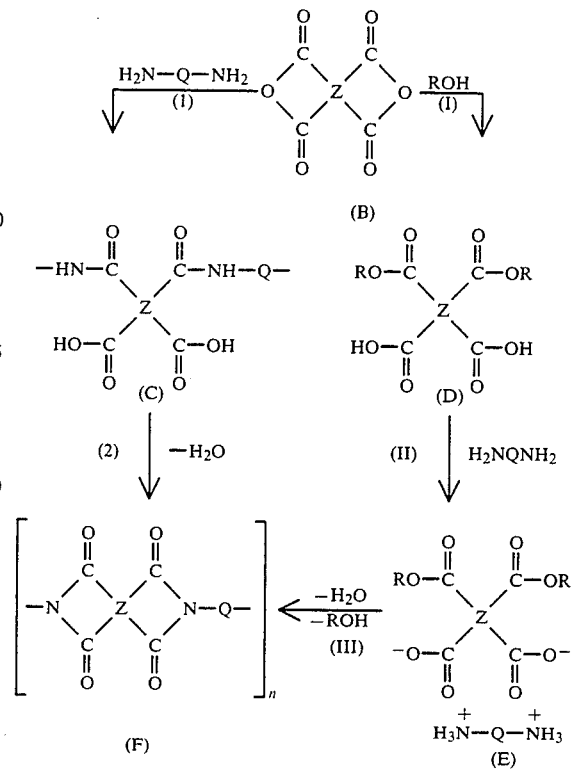

Thus, dianhydride (B) may be first converted by reaction with diamine H$_2$NQNH$_2$ into polyamide acid (C), which then can be chemically or thermally dehydrated to polyimide (F). Alternatively, dianhydride (B) is first esterified with alcohol ROH (e.g., ethyl alcohol, R=C$_2$H$_5$) to diester diacid (D), which forms with diamine H$_2$NQNH$_2$ salt (E). This salt then is thermally cyclized to polyimide (F). Water and, in the appropriate case, alcohol liberated at high temperature are evaporated from the surface of the fibrous composite substrate, and the polyimide remains. The evaporation of reaction solvent, water, and alcohol can cause void formation because of vapor entrapment in the polymer mass. In order to eliminate the voids, it is expedient to compress the freshly made, hot composite to break up the gas bubbles and expel the gases. However, this is possible only when the polyimide can be heated without significant decomposition to a temperature at which it is sufficiently low in viscosity to respond effectively to such a treatment.

The most commonplace tetracarboxylic acid dianhydride used in the manufacture of polyimides is pyromellitic dianhydride, sometimes hereafter referred to as PMDA, represented by formula (G), below:

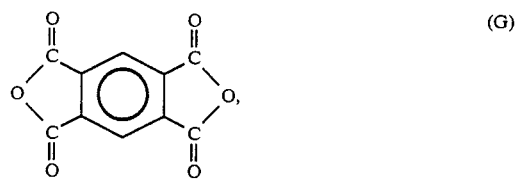

Another representative dianhydride used for this purpose is 3,3',4,4'-benzophenonetetracarboxylic acid dianhydride (BTDA), formula (H), below:

(H)

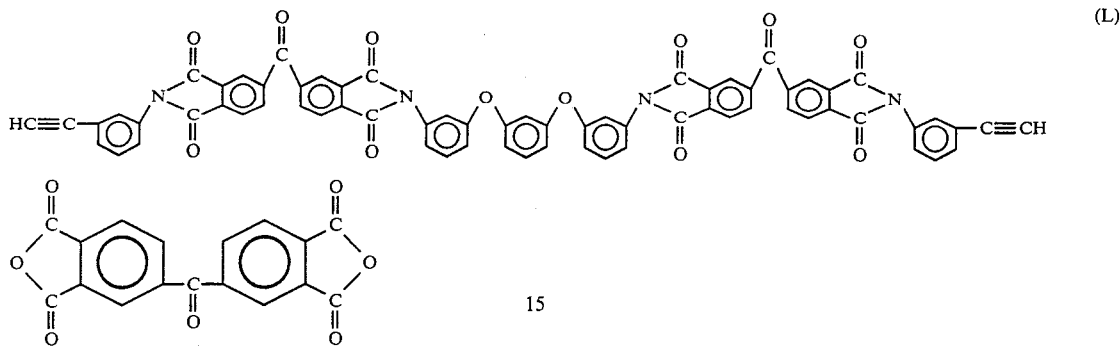

products by means of the acetylene end-group coupling reactions.

(L)

15

A tetracarboxylic acid, 2,2-bis(3,4-dicarboxyphenyl)-hexafluoropropane, formula (I), below, has been used in some polyimides,

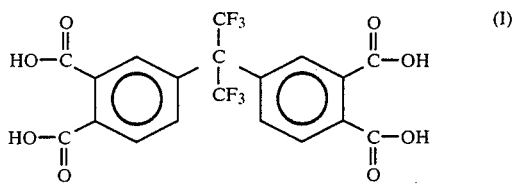
(I)

which were made from the tetracarboxylic acid, a diamine, and a suitable solvent in one step by heating the well mixed ingredients to a sufficiently high temperature.

It was known in the past that the usual all aromatic PMDA-based polyimides were not melt-fusible because their crystalline melting points were well above the onset of thermal decomposition, which is about 450° C. A crystalline, high molecular weight, infusible polyimide was formed with such diamines as m-phenylenediamine, p-phenylenediamine, 4,4'-oxydianiline (J), and 1,3-bis(4-aminophenoxy)benzene (K).

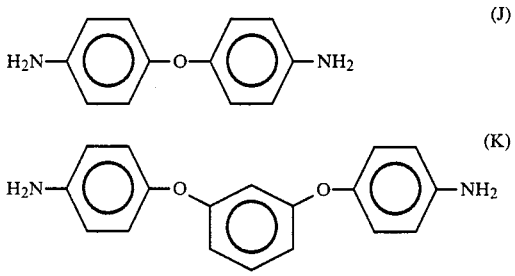

Fiber reinforced laminates based on the usual polyimides made from precursor solutions involving BTDA, formula (H), would normally have a high void content, which would not be readily eliminated because of crosslinking reactions of ketone carbonyl groups with amino groups. Because of this porosity, both the mechanical properties and the long term thermal-oxidative stability of the polyimides were adversely affected. A commercial product developed by Hughes Aircraft Company and sold under the name "Thermid" 600, could, however, be processed to a low void product. The uncured low molecular weight acetylene end-capped oligomer (formula L) could be converted to a high molecular weight product without the evolution of volatile by-products by means of the acetylene end-group coupling reactions.

In spite of this advantage over other BTDA-based polyimides, this product was brittle and had low thermal-oxidative stability.

Polyimides based on the tetracarboxylic acid (I) could be processed to a low void product, which had excellent physical properties. However, the starting tetracarboxylic acid is quite expensive.

Polyimides based on PMDA and 2,2-bis[4-(4-aminophenoxy)phenyl]propane (M)

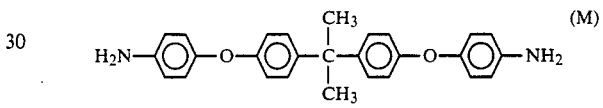
(M)

have been reported independently by Sachindrapal et al., *Makromol. Chem., Rapid Comm.* 1, 667–670 (1980), and by Sazanov et al. *Vysokomol. Soedin.*, (B), 20, 820–824 (1978), No. 11.

Polyimides based on the hexafluoroisopropylidene analog of diamine M and various dianhydrides also are disclosed in U.S. Pat. No. 4,111,906 to Jones et al. (TRW, Inc.), and preparation of two such polyimides is described in the examples. However, neither the above two publications nor the patent suggest the melt fusibility of any of the polyimides.

It thus appears very desirable to be able to produce polyimides based on pyromellitic dianhydride (or on pyromellitic acid), which would be melt-fusible, would have sufficiently low viscosity below their decomposition temperature to permit efficient working, especially removal of gas and voids, would have good physical properties in their cured form, and would have good oxidative stability.

SUMMARY OF THE INVENTION

According to the present invention, there is now provided a class of fusible polyimides, which have at least one type of repeating unit (N), below:

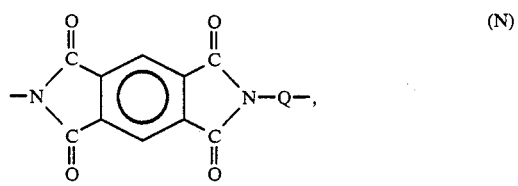
(N)

where Q is a divalent organic radical selected from the following,

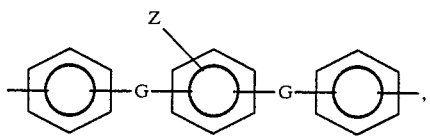  (a)

where G is O or S; and Z is hydrogen or phenyl; and, when Z is hydrogen, both terminal covalent bonds are either in the ortho or meta position with respect to G; while, when Z is phenyl, both terminal covalent bonds are in ortho, meta, or para position with respect to G;

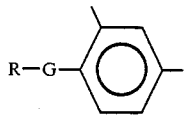  (b)

where G is O or S; and R is phenyl, biphenyl, or naphthyl and;

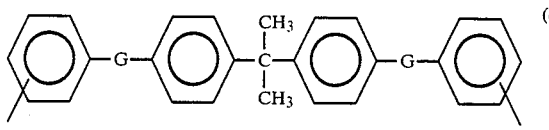  (c)

where G is O or S, and both terminal covalent bonds are in the ortho or meta position with respect to G.

Further, there are provided polyimide precursor solution compositions, which can be processed to give the same polyimides.

There also are provided composite materials based on a fibrous substrate imgregnated with a polyimide of the above formula (N), wherein Q can be any of (a), (b), and (c), above, or the following structure (e):

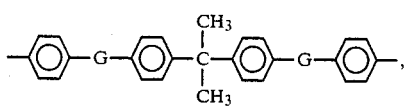  (e)

where G is O or S.

DETAILED DESCRIPTION OF THE INVENTION

All the polyimides of the present invention can be made by the process illustrated by equations (1) and (2), above. In addition, they can be made by the process illustrated by equations (I), (II), and (III), above. It can thus be seen that formula (N), above is derivable from pyromellitic acid and from a diamine $H_2N-Q-NH_2$. For convenience, the repeating unit of the polyimides of this invention will sometimes be defined by reference to $H_2N-Q-NH_2$, rather than to Q. The acid moiety is supplied either by pyromellitic dianhydride or by a diester of pyromellitic acid, e.g., the 1,5-diethyl or the 1,5-dimethyl ester. The diamine $H_2N-Q-NH_2$ is one where Q belongs to one of the three classes (a), (b), and (c), and defined in the Summary of the Invention. Typical diamines suitable in the preparation of the polyimides of this invention include the following:

1,3-bis(2-aminophenoxy)benzene;
1,2-bis(3-aminophenoxy)benzene;
1,2-bis(2-aminophenoxy)benzene;
1,4-bis(3-aminophenoxy)benzene;
1,4-bis(2-aminophenoxy)benzene;
1,3-bis(3-aminophenoxy)benzene;
2,4-diaminodiphenyl ether;
2-(2,4-diaminophenoxy)biphenyl;
1-(2,4-diaminophenoxy)naphthalene;
2-(2,4-diaminophenoxy)naphthalene;
4-(2,4-diaminophenoxy)biphenyl;
2,2-bis[4-(3-aminophenoxy)phenyl]propane;
2,2-bis[4-(2-aminophenoxy)phenyl]propane;
1,4-bis(4-aminophenoxy)-2-phenylbenzene;

For the preparation of composites 2,2-bis[4-(4-aminophenoxy)phenyl]propane, one of the diamines $H_2N-Q-NH_2$ where Q belongs to class (e) defined in the Summary of the Invention, also can be used.

Certain diamines suitable in the practice of the present invention are available commercially. For example, 2,2-bis[4-(4-aminophenoxy)phenyl]propane is available from Mitsui Toatsu. Other diamines can be made by methods known to organic chemists, for example, coupling a chloronitrobenzene with a dihydroxy aromatic compound and reducing the nitro groups. Many such preparations are described in the technical and patent literature. Instead of a single diamine, mixtures of two or more diamines may be used; for example, position isomers of the same diamine; or two diamines where Q belongs to the same class (a), (b), or (c); or two diamines from different classes. In addition, a small proportion of a diamine of the present invention can usually be replaced by another diamine capable by itself of forming melt-fusible polyimides with pyromellitic dianhydride, e.g., an aliphatic diamine.

Various diamines $H_2NQNH_2$, where Q belongs to class (a) defined in the Summary Of The Invention can be made by one of the methods described in Example 6, below, using the following starting materials, available from the indicated commercial suppliers:

| Starting Materials | Availability |
| --- | --- |
| 1,2-dihydroxybenzene | Rhone Poulenc |
| 1,3-dihydroxybenzene | Aldrich Chem. Co. |
| 1,4-dihydroxybenzene | Eastman Chem. Prod. |
| o-dibromobenzene | Aldrich Chem. Co. |
| m-dibromobenzene | Aldrich Chem. Co. |
| p-dibromobenzene | Aldrich Chem. Co. |
| o-chloronitrobenzene | Du Pont |
| p-chloronitrobenzene | Du Pont |
| m-hydroxyaniline | Aldrich Chem. Co. |
| 2-aminothiophenol | Aldrich Chem. Co. |
| 3-aminothiophenol | Aldrich Chem. Co. |
| phenylhydroquinone | Aldrich Chem. Co. |

The particular diamines and the method used (identified by example number) are listed below:

| Diamine | Method of Example 6 |
| --- | --- |
| 1,2-bis(2-aminophenoxy)benzene | A |
| 1,2-bis(3-aminophenoxy)benzene | B |
| 1,3-bis(2-aminophenoxy)benzene | A |
| 1,3-bis(3-aminophenoxy)benzene | B |
| 1,4-bis(2-aminophenoxy)benzene | A |
| 1,4-bis(3-aminophenoxy)benzene | B |
| 1,2-bis(2-aminophenthio)benzene | B |
| 1,2-bis(3-aminophenthio)benzene | B |
| 1,3-bis(2-aminophenthio)benzene | B |
| 1,3-bis(3-aminophenthio)benzene | B |
| 1,4-bis(2-aminophenthio)benzene | B |
| 1,4-bis(3-aminophenthio)benzene | B |
| 1,4-bis(4-aminophenoxy)-2-phenylbenzene | A |

Diamines H₂NQNH₂, where Q belongs to class (b) defined in the Summary of the Invention can be made according to the method of Example 6A, below, from the following starting materials.

| Starting Materials | Availability |
|---|---|
| 1-chloro-2,4-dinitrobenzene | Aldrich Chem. Co. |
| 2-hydroxybiphenyl | Aldrich Chem. Co. |
| 3-hydroxybiphenyl | Pfaltz & Bauer |
| 4-hydroxybiphenyl | Aldrich Chem. Co. |
| 1-hydroxynaphthalene | Aldrich Chem. Co. |
| 2-hydroxynaphthalene | Aldrich Chem. Co. |
| Phenol | several sources |
| Diamines | |
| 2,4-diaminodiphenylether | |
| 2-(2,4-diaminophenoxy)biphenyl | |
| 3-(2,4-diaminophenoxy)biphenyl | |
| 4-(2,4-diaminophenoxy)biphenyl | |
| 1-(2,4-diaminophenoxy)naphthalene | |
| 2-(2 4-diaminophenoxy)naphthalene | |

Diamines H₂NQNH₂, where Q belongs to class (c) illustrated by a formula in the Summary of the Invention can be made by the method of Example 6A from the following starting materials available from the indicated sources:

| Starting Materials | Availability |
|---|---|
| Bisphenol A | Dow Chemical Co. |
| o-chloronitrobenzene | Du Pont |
| m-chloronitrobenzene | Aldrich Chem Co. |
| Diamines | |
| 2,2-bis[4-(3-aminophenoxy)phenyl]propane | |
| 2,2-bis[4-(2-aminophenoxy)phenyl]propane | |

Although from the standpoing of producing the highest molecular weight it may be advisable to use the starting dianhydride or diester diacid and diamine in stoichiometric proportions, it may be preferred to use a slight excess, up to about 10% and preferably 1-6%, of one of the reactants to limit molecular weight build-up, thus achieving a better compromise between melt fusibility and mechanical properties. It may be desired to cap the end groups with a suitable monofunctional reagent in order to enhance the melt viscosity stability of the product. Although one can use an excess of either component, it is preferred to use an excess of the diamine, which can be conveniently capped by conversion to the corresponding phthalimide. The end-capping agent thus may be either phthalic anhydride or a phthalic acid ester. When an excess of PMDA or of pyromellitic acid diethyl ester is used, the end groups are capped, for example, with aniline.

While this invention contemplates the use of PMDA or pyromellitic diacid diester, a small proportion of such material may be replaced by another aromatic dianhydride, diacid diester, or tetracarboxylic acid which by itself is capable of forming melt-fusible polyimides with the aromatic diamines of the present invention.

The polycondensation reaction is usually carried out in a solvent. In the preparation of precursor solutions it is practical to keep the total solids concentration at no more than about 70%, preferably 40-65% by weight. Suitable solvents have polar groups, such as alcohol, ether, ketone, amide, or sulfoxide. Preferred solvents are N-methyl-2-pyrrolidone and mixtures of N-methyl-2-pyrrolidone with ethanol. Other suitable solvents include, for example, N,N-dimethylacetamide and diglyme. Starting with PMDA, the first step of the reaction is exothermic, so that no additional heating normally is required, and cooling may be advisable. A polyamide acid is formed, as shown in equation (1), above. Dehydration of this intermediate can be accomplished either by a further treatment with a dehydrating agent, such as acetic anhydride or a mixture of acetic anhydride with pyridine, or by heating to a high temperature either with or without a solvent. Chemical dehydration is preferred for the manufacture of neat polyimide resins, while thermal dehydration is better suited for curing polyimide precursor solutions in situ to form composite structures.

The polyimides of the present invention are melt-fusible, that is, they can be handled in the melt without deleterious decomposition. Their glass transition temperature, $T_g$, or melting temperature, $T_m$, depending on whether they are amorphous or crystalline, is below about 450° C. The preferred $T_g$ or $T_m$ range is 180°-400° C. because it covers a wide variety of fabrication processes as well as of useful applications. A good indication of melt fusibility is the ability of the polyimides of the present invention to form a flexible film by compression molding or to be drawn into filaments.

The composite sheets which can be made by impregnating a fibrous substrate with polyimide precursor solutions can be based on a number of such substrates, woven, nonwoven, tow, felt, unidirectional continuous fibers, etc. For many applications, such as various aerospace components, carbon fibers and aramid fibers, which produce light and strong composites, are the most preferred. Other fibers include, among others, glass, boron, and asbestos fibers. The polyimide itself may be filled with reinforcing additives, which may be fibrous, as above, or particulate. Particulate fillers include, for example, carbon and graphite powders, mica, silica, clay, and silicon carbide whiskers. Whether one deals with a fiber-reinforced or particular-filled polyimide composition, the product will usually contain about 5 to about 70 volume % of the additive. For particulate-filled compositions, the range is 5-50 volume %, especially 5-25 volume %.

The usual technique for making composites involves a two-step operation. In the first step a fibrous substrate is impregnated with a solution of polyimide precursors in an appropriate solvent, and the impregnated substrate is heated, usually at an elevated temperature, to reduce the volatiles content, usually to about 25 weight % or less, preferably 10-20%. The partly devolatilized, impregnated fibrous substrate, so-called prepreg, is then used to form the final shaped article, either as a single layer but normally as a multilayer structure, and the polyimide is formed in situ by heating the shaped article to a suitable temperature, for example, 350° C. or higher.

Prepregs contain up to about 70 volume % of fibers (on volatiles-free basis), preferably 40-65%.

Impregnation of a fibrous substrate directly with a molten stoichiometric polyimide is usually not practical because of excessively high melt viscosity of the polyimide even at temperatures approaching its decomposition temperature. However, when an end-capped non-stoichiometric polyimide is employed, impregnation of a fibrous substrate with such a molten polyimide without decomposition is entirely feasible. Such impregnated structures (sometimes called cured prepregs) are formed into shaped articles with the aid of equipment permitting localized heating to high temperature, so that the cured prepreg is heat-shaped into the final article in one step. Similarly, a normal "wet" prepreg can be heated to a high enough temperature to cause both devolatilization and curing and then heat-shaped into the final article.

The polyimides of the present invention can be used in such diverse applications as composite sheets which can be formed into articles such as aircraft and autobody panels, appliance housings, printed circuit boards, and missile parts; films, especially films which must be capable of withstanding high temperatures, such as, for example, wire insulation and flexible circuits; coatings, e.g., electrical cable coatings, especially for high temperature applications such as electric motor windings; generator components; and transformer parts.

This invention is now illustrated by certain representative embodiments thereof, where all parts, proportions, and percentages are by weight, unless otherwise indicated. All the units are those adopted by American National Metric Council, Guide SIG-04 (1978).

Pyromellitic dianhydride is commercially available from Veba Huls of the German Federal Republic; however, pyromellitic dianhydride available internally from Du Pont was used.

N,N-Dimethylacetamide (DMAc), which was used as the solvent in some reactions, was stored over 4 A molecular sieves (activated by heating 4 hours at 450° C. in a stream of nitrogen), and before use was filtered through activity I acidic alumina (to remove dimethylamine). Pyridine was dried by distillation from calcium hydride and was stored over activated 4 A molecular sieves.

All the inherent viscosity measurements were obtained at a concentration of approximately 0.5 g/100 mL of solution at room temperature. The polyamide acid solutions were diluted to the required concentration with DMAc. The polyimide viscosity determinations were carried out at approximately the same concentrations in 100% sulfuric acid. The inherent viscosity of intermediate polyamide acids was kept within the range of about 0.2–3.0 dL/g.

EXAMPLE 1

Stoichiometric Polyimide Preparation

A flame-dried 200 mL resin kettle, fitted with a mechanical stirrer and a nitrogen inlet, was used in this polymerization. To this vessel was added 5.84 g (0.02 mole) of 1,3-bis(3-aminophenoxy)benzene, formula (O),

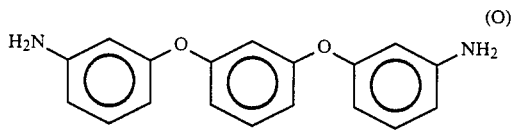

(O)

and 52 mL of DMAc. Stirring was commenced and cooling applied with an ice bath. To the cooled solution was added 4.36 g (0.02 mole) of pyromellitic dianhydride. The ice bath was removed after 15 min. and the reaction mixture was stirred at room temperature for 2 hrs. The resulting viscous solution of polyamide acid was imidized by dropwise addition to a mixture of 52 mL of DMAc, 5 mL of acetic anhydride and 4 mL of pyridine at reflux. The total time of addition and post-addition reflux was 3.5 hours. The precipitated polyimide was separated by filtration, washed with methanol and dried in vacuo at 60° C. The polyimide was obtained as a yellow powder (7.7 g, 78%) which had an $\eta_{inh}=0.66$ dL/g at 0.5 wt % in sulfuric acid. By DSC (differential scanning calorimetry) analysis, this polyimide had a Tm=307° C. After melting, the polyimide was amorphous with Tg=218° C. It could be compression molded into a flexible film.

EXAMPLE 2

Non-Stoichiometric Polyimide Preparation

Into a 500 mL round-bottom flask equipped with a mechanical stirrer, a thermometer and a nitrogen inlet was added 14.75 g (0.0505 mole) of 1,3-bis(3-aminophenoxy)benzene, formula (O), and 208 g of DMAc. The solution was cooled to 10° C.; then 10.91 g (0.0500 mole) of PMDA, formula (G) was added with stirring. The resulting solution was stirred at room temperature for 3 hours, and then slowly added to a mixture of 50 mL of DMAc, 50 mL of acetic anhydride and 50 mL of pyridine at 80°–100° C. The resulting mixture was heated at 100° C. for 1 hour, cooled to room temperature and filtered. The polyimide was washed with methanol and dried. It showed a Tm of 292° C. when determined by differential scanning calorimetry the first time. On reheating, only a Tg at 212° C. was observed. A flexible film was obtained by compression molding at 370° C.

A polyimide prepared in the same manner with a 5% excess of 1,3-bis(3-aminophenoxy)benzene had the following melt flows at 360° C. using a 2103 g weight and a 0.209 cm orifice.

| Hold Time (minutes) | g/10 minutes |
| --- | --- |
| 1 | 8.2 |
| 5 | 10.3 |
| 10 | 10.8 |
| 20 | 9.0 |

The stability of the melt flow indicates the melt-processability of the polyimide.

EXAMPLE 3

Thermal Imidization

Into a 1 L round bottom flask equipped with a thermometer and a mechanical stirrer there was added 194 mL of absolute ethanol, 152.6 g (0.70 mole) of PMDA, and 200 mL of N-methyl-2-pyrrolidone in that order. The resulting slurry was heated for one hour at 60°–65° C. to dissolve the solids; then, a solution of 75.3 g (0.184 mole) of diamine (M) and 161 g (0.551 mole) of 1,3-bis(3-aminophenoxy)benzene, formula (O), in 60 mL of N-methyl-2-pyrrolidone was added. There thus was present in the solution a 5 mole % excess of diamines, which were employed in molar ratio of 25% of diamine (M) and 75% of diamine (O). The reaction solution was heated for one hour at 60°–65° C. with stirring. At that time, it had a Brookfield viscosity of 0.19 Pa.s at 23° C. The solids content of the solution was 45.2% (calc. 45%), as determined by accurately weighing 5–10 g of the solution is a small aluminum dish and heating to constant weight, first at 225° C. for 2 hours, then at 375° C. for 30 minutes. The resulting dry, cured polyimide was tough and had a Tg of 222° C. and a Tm of 308° C. by DSC.

EXAMPLE 4

Stoichiometric Copolyimide Preparation; Chemical Imidization

In a 500 mL resin kettle fitted for mechanical stirring were placed 7.31 g (0.025 mole) of 1,3-bis(3-aminophenoxy)benzene, 10.26 g (0.025 mole) of 2,2-bis[4-(4-aminophenoxy)phenyl]propane, and 160 mL of DMAc. After the diamines had dissolved, the solution was cooled with ice; 10.91 g (0.050 mole) of PMDA was added and rinsed into the kettle with 12 mL of DMAc. After 15 minutes, the ice bath was removed, and the kettle was stirred for 2 hours at room temperature. A small sample (0.297 g) of the solution was removed, diluted with DMAc to 10 mL, and found to have an inherent viscosity of 0.89 dL/g. The remainder of the reaction solution was added dropwise to a refluxing mixture of 100 mL of DMAc, 12 mL of acetic anhydride, and 10 mL of pyridine. Two hours after the completion of the addition the mixture was cooled to room temperature; the precipitated polyimide was isolated by filtration and vacuum dried overnight at 70° C., then dried 3 hours at atmospheric pressure in a stream of nitrogen at 200° C. The dry polyimide had a Tm (by DSC) of 369° C., and after melting and resolidifying had a Tg of 257° C. and a Tm of 354° C.

EXAMPLE 5

Non-stoichiometric Copolyimide Preparation; Chemical Imidization

The same starting materials and solvent were used as in Example 4, above. The amount of PMDA now was 10.58 g (0.049 mole), while the amounts of the diamines were the same as in Example 4 (0.050 mole total). Following the initial period in an ice bath, as in Example 4, the solution was stirred for 1.5 hours at room temperature; 1.0 g of phthalic anhydride was then added to cap the amine end groups of the polymer. Imidization and workup were as described before. The inherent viscosity of the intermediate polyamide acid was 0.59 dL/g. The resulting polyimide had a Tm of 372° C. and a Tg of 240° C. (by DSC) when heated the first time.

A similar procedure was employed for the preparation of a polyimide from PMDa and a 4% molar excess of 2,2-bis[4-(4-aminophenoxy)phenyl]propane. Following cooling in an ice bath, an excess of phthalic anhydride was added to cap the amine end groups. After one-hour stirring, the inherent viscosity of the polyamide acid solution was 0.58. Imidization and isolation were as above. The polyimide had a Tm=423° C. by DSC the first time through. Upon reheating, the Tm was 410° C. and Tg=317° C.

EXAMPLE 6

Preparation of Starting Diamines (A) 1,3-bis(2-aminophenoxy)benzene

A 2 liter, 3-necked, round bottom flask fitted with a mechanical stirrer and a reflux condenser topped with a nitrogen inlet was charged with 110 g (1.0 mole) of resorcinol, 315 g (2.0 moles) of o-chloronitrobenzene, 305 g (2.2 moles) of potassium carbonate, and 375 mL of DMAc. The mixture was heated at reflux for 4 hours and filtered hot. The filtrate was cooled to room temperature and added to 0.75 liter of methanol. The precipitated 1,3-bis(2-nitrophenoxy)benzene was filtered, washed with methanol, and vacuum dried at 70° C. The yield was 145.3 g (41%).

A mixture of 145.3 g of 1,3-bis(2-nitrophenoxy)benzene, 340 mL of butanol, 9 mL of triethylamine, and 1.7 g of 5% palladium on carbon was heated to 70° C. in a 1.0 liter stainless steel stirred autoclave and pressurized with hydrogen to 4.1 MPa. This pressure was maintained for 1 hour after the hydrogen uptake had ceased. The autoclave was cooled to room temperature and discharged. The product slurry redissolved on reheating; the solution was filtered through diatomaceous earth to remove the catalyst, cooled to room temperature, and the product precipitated with hexane. The precipitated product was recovered by filtration and vacuum dried at 70° C. The yield of 1,3-bis(2-aminophenoxy)benzene was 95.2 g (79%).

(B) 1,4-bis(3-aminophenoxy)benzene

A 250 mL, 3-necked, round bottom flask fitted with a mechanical stirrer, a still head, a condenser with a nitrogen inlet on the take-off adapter, and a thermometer was charged with 150 mL of pyridine and 21.8 g (0.20 mole) of m-aminophenol. After the m-aminophenol dissolved, 10.8 g (0.20 mole) of sodium methoxide was added. Methanol, formed in this reaction, was distilled off. When the still head temperature reached 110° C., the still head was replaced with a reflux condenser, and 23.6 g (0.10 mole) of p-dibromobenzene and 0.1 g of cuprous chloride were added. The mixture was heated at reflux at 117° C. for 3 hours; 25 mL of DMAc was added to help dissolve sodium m-aminophenoxide formed in the first step. Refluxing was continued for 19 additional hours; the reaction mixture was then cooled to room temperature, filtered to remove inorganic salts, and poured into water. The resulting aqueous solution was extracted with three 300 mL portions of methylene chloride; the extract was dried over magnesium sulfate, decolorized with active carbon, and filtered through diatomaceous earth. Methylene chloride was vacuum-evaporated, and the liquid residue was poured into stirred concentrated hydrochloric acid. The precipitated dihydrochloride of 1,4-bis(3-aminophenoxy)benzene was filtered, washed with concentrated hydrochloric acid, and dried. It then was dissolved in a minimum amount of water containing a small amount of ascorbic acid as antioxidant. The solution was decolorized with activated carbon, filtered through diatomaceous earth, and neutralized with concentrated ammonium hydroxide. The precipitated product was separated by filtration and vacuum-dried overnight at 65° C. The dry diamine weighed 12.4 g (42% yield). Recrystallization from 35 mL of butanol gave 8.6 g of product melting at 98°–99° C., which was distilled bulb-to-bulb to give 6.5 g of colorless 1,4-bis(3-aminophenoxy)benzene melting at 99°–100° C.

EXAMPLE 7

Preparation of Polyimide Resin Films

An N-methyl-2-pyrrolidone solution consisting of 150 g of pyromellitic diethyl ester diacid and 1,3-bis(3-aminophenoxy)benzene in a mole ratio of 1:1.05, at a concentration calculated to give 45% of resin solids after cure, was placed in an aluminum pan, and the solvent was evaporated. The remaining material was evaporated by heating in air for 2 hours at 180° C. The brittle, yellow, low molecular weight polyimide which formed in this first step, was ground to a fine powder and heated for one additional hour at 290° C. under a nitrogen blanket. The final product was almost completely devolatized, containing 0.2% of volatiles.

A film was compression molded from 6.9 g of the polyimide in a 7.6 cm×12.7 cm positive pressure mold coated with a release agent and placed in a press preheated to 390° C. The mold temperature reached 371° C. in 20 minutes and was maintained at 371° C. for additional 5 minutes. A pressure of 6.9 MPa was then applied and held for 1 minute. The mold was immediately cooled under pressure to room temperature. A polyimide film having a thickness of 0.046 cm was thus obtained.

In a similar manner, a polyimide film was obtained from pyromellitic diethyl ester diacid and a 5% excess of a 25%/75% mixture of 2,2-bis[4-(4-aminophenoxy)-phenyl]propane with 1,3-bis(3-aminophenoxy)benzene.

Certain physical properties of polyimide resins obtained in the above-described manner from pyromellitic diethyl ester diacid and a 4%, 5%, and 6% excess of 1,3-bis(3-aminophenoxy)benzene as well as a 5% excess of a mixture of 2,2-bis[4-(4-aminophenoxy)phenyl]propane with 1,3-bis(3-aminophenoxy)benzene are listed in Table I, below. Melt index measurements were made at 371° C. using a 2103 g weight and a 0.209 cm orifice.

TABLE I

| Amine (% excess) | | Density, g/cm$^3$ | Tg °C. | Tm °C. | Test Temp, °C. | Tensile Str. MPa | Tensile Mod. Mpa | % Elong (yield) | Melt Index g/10 min at 371° C. |
|---|---|---|---|---|---|---|---|---|---|
| 1,3-bis(3-aminophenoxy)benzene | (4) | 1.39 | 219 | — | 23 | 108.2 | 2475 | 6.8 | 0 |
| | | | | | 93 | 79.3 | 2241 | 5.0 | |
| | (5) | 1.38 | 208 | — | 23 | 104.1 | 2379 | 6.4 | 9.8 |
| | | | | | 93 | 80.7 | 2213 | 5.1 | |
| | (6) | 1.37 | 207 | — | 23 | 102.7 | 2620 | 5.3 | 39 |
| | | | | | 93 | 82.7 | 2310 | 4.7 | |
| 25/75 mole % mixture of 2,2-bis[4-(4-aminophenoxy)-phenyl]benzene and 1,3-bis(3-aminophenoxy)-benzene | (5) | 1.38 | 230 | 300 | 23 | 103.4 | 2565 | 6.1 | 1.6 |
| | | | | | 93 | 87.6 | 2413 | 5.3 | |

Additional polyimides based on pyromellitic diethyl ester diacid and 1,3-bis(3-aminophenoxy)benzene were prepared in the same manner in other solvents, as shown below in Table II.

TABLE II

| Reactant in excess (excess, mole %) | End-capping agent | Solvent | Tg °C. |
|---|---|---|---|
| Diamine (5) | — | methanol | 210 |
| Diamine (5) | — | ethanol | 209 |
| Diamine (5) | — | diglyme | 210 |
| Acid ester (5) | — | 3:1 N—methyl-2-pyrrolidone/ethanol | 216 |
| Acid ester (8) | — | 3:1 N—methyl-2-pyrrolidone/ethanol | 214 |
| Diamine (5) | phthalic anhydride | 3:1 N—methyl-2-pyrrolidone/ethanol | 201 |
| Diamine (3) | phthalic anhydride | 3:1 N—methyl-2-pyrrolidone/ethanol | 208 |
| Acid ester (3) | Aniline | ethanol | 215 |

In all cases melt-fusible polyimides were obtained.

EXAMPLE 8

Several polyimides were prepared from equimolar amounts of pyromellitic dianhydride and various diamines by chemical imidization taught in Example 4. Table III, below, provides the inherent viscosities of the intermediate polyamide acids and Tg, and Tm values for the resulting polyimide resins. $Tg^1$ and $Tm^1$ in the table are values obtained for the polyimides as made. $Tg^2$ and $Tm^2$ are values obtained on reheating.

TABLE III

| Run | Diamine | Inh. Visc. dL/g | $T_g^1$ °C. | $T_m^1$ °C. | $T_g^2$ °C. | $T_m^2$ °C. |
|---|---|---|---|---|---|---|
| a | 1,2-bis(3-aminophenoxy)-benzene | 0.10 | — | 272 | — | — |
| b | 1,3-bis(3-aminophenoxy)-benzene | 0.66 | — | 307 | 218 | — |
| c | 1,4-bis(3-amino.ohenoxy)-benzene | 0.89 | — | 391 | 252 | 386 |
| d | 1,2-bis(2-aminophenoxy)-benzene | 0.33 | — | 288 | 261 | — |
| e | 1,3-bis(2-aminophenoxy)-benzene | 0.40 | — | 361 | 251 | — |
| f | 1,4-bis(2-aminophenoxy)-benzene | 0.46 | — | 295 | 294 | — |

Similarly, polyimides were prepared from pyromellitic dianhydride (PMDA) and mixtures of 2,2-bis[4-(4-aminophenoxy)phenyl]propane (bis-4,4'-APPP) and another diamine. Table IV provides the inherent viscosities, Tg, and Tm values for polyimide resins derived from stoichiometric combinations of monomers. The explanation of Tg and Tm superscripts is the same as in Table III, above.

TABLE IV

| Run | Other diamine and bis-4,4'-APPP/other diamine mole ratio | Inh. Visc. dL/g | $T_g^1$ °C. | $T_m^1$ °C. | $T_g^2$ °C. | $T_m^2$ °C. |
|---|---|---|---|---|---|---|
| g | 1,3-bis(2-abinophenoxy)-benzene; 50/50 | 0.56 | — | — | 257 | 342 |
| h | 2,2-bis[4-(2-aminophenoxy)-phenyl]-propane; 70/30 | 0.47 | — | 305 | 261 | 339 |
| i | 2-(2,4-diaminophenoxy)-biphenyl 25/75 | 1.61 | 326 | 343 | 314 | — |

All the polyimides prepared in this example were melt-fusible.

Polyimides c and h, which exhibit a crystalline melting point and then, after cooling and resolidifying, still exhibit a crystalline melting point are said to have reversible crystallinity. Such polyimides are quite rare.

EXAMPLE 9

Polyimide from PMDA and 1,4-bis(4-aminophenoxy)-2-phenylbenzene

The diamine, 1,4-bis(4-aminophenoxy)-2-phenylbenzene, was prepared from phenylhydroquinone and p-chloronitrobenzene according to the general method described in Example 6(A). The polyimide from this amine and PMDA was prepared as follows:

A solution 7.37 g (0.02 mole) of the diamine in 65 mL of dimethylacetamide (DMAc) in a 200 mL resin kettle was cooled in an ice bath. Solid PMDA (4.36 g, 0.02 mole) was added and rinsed in with 6 mL of DMAc. After 15 minutes, the ice bath was removed and mechanical stirring continued for 2 hours. After standing for an additional 15 hours, the inherent viscosity of the polyamide acid was 1.0 dL/g (0.57 wt. %). The polyamide acid was then imidized by dripping it into a mixture of 50 mL of DMAc, 4 mL of pyridine, and 5 mL of acetic anhydride; the polyimide precipitated during the addition. Reflux was maintained for 2 hours; the mixture was then cooled to ambient temperature, diluted with acetone, stirred for 15 minutes, and filtered. The polyimide was washed with acetone, dried in vacuo at 60° C. to remove most of the solvent, and then at 210° C. to complete the solvent removal. The polyimide thus prepared had a Tm (by DSC) of 352° C., and after melting and resolidifying was amorphous with Tg=286° C.

Non-stoichiometric polyimides were prepared from the same starting materials in a modification of the procedure given above. The same amount of PMDA was used, but in two separate runs 9 and 10% excess diamine was employed. The amount of DMAc was changed to give a 15 wt % solution of polyamide acid. After stirring for 1.5 hours at ambient temperature, inherent viscosities were determined in DMAc (0.57 wt %) as 0.62 and 0.57 dL/g, respectively, for the 9 and 10% excess amine polyimides. At this point excess phthalic anhydride, 1.0 g (0.007 mole), was added to endcap the polymer chains. After stirring for 30 more minutes, the polyamide acid solution was diluted with an equal volume of acetone, and the mixture was heated to reflux. A mixture of 5 mL of acetic anhydride and 4 mL of pyridine was added rapidly to imidize the polyamide acid. The polyimide precipitated as a powder, and after 2 hours at reflux was cooled, filtered, washed with acetone, and dried in vacuo as described above for the stoichiometric polyimide. By DSC, the polyimide with 9% excess diamine showed initially two melting points, 289° C. and 317° C., and in a second heating appeared amorphous with Tg=262° C. The polyimide with 10% excess diamine had an initial Tm=298° C. and on the second heat appeared amorphous with Tg=256° C.

To assess these non-stoichiometric polyimides for melt-processability and melt stability, melt flows in a melt index apparatus were measured. A weight of 7.2 kg, a 0.209 cm orifice, and a temperature of 385° C. were used. After a 10 minute hold-up time at 385° C. the 9% excess polyimide had a melt flow of 6.4 g/10 minutes, the 10% excess polyimide 12.7 g/10 minutes. After a 30 minutes hold-up time, the 9% excess polyimide had a melt flow of 4.6 g/10 minutes (72% retention); after 60 minutes the melt flow of the 10% polyimide was 8.6 g/10 minutes (68% retention).

EXAMPLE 10

Preparation of Composites using Polyimide Precursor Solutions

Test composites were made in two steps. In the first step, a woven graphite fiber fabric ("Magnamite", Style A193P, Hercules, Inc.) placed on a release film was impregnated with a solution of polyimide precursor in appropriate solvent. This wet so-called prepreg was dried for 30 min. on a hot plate preheated to 160° C. The bottom release film was then removed, and the prepreg was turned over on the other side and heated for additional 15 minutes. The resulting dry prepreg still contained about 7–9% of volatiles and had a cured resin content of about 31 to 34%.

In the second step, a stack of twelve plies of prepreg material about 7.5×12.5 cm large and 2.12 mm thick was laid up in a microporous polypropylene film ("Celgard", Celanese Corp.) envelope contained in a positive pressure mold enclosed in a vacuum bag evacuated and maintained at a pressure of 103 Pa. The vacuum bag assembly was the same as that described by H. H. Gibbs in "Processing of Composites based on NR-150B2", 10th National SAMPE Technical Conference, Kiamesha Lake, N.Y., Oct. 17, 1970, Vol. 10, page 211. It was heated to 371° C. at a rate of about 2° C. per minute. Pressure of 6.9 MPa was then applied at that temperature, and after 1 minute the assembly was allowed to cool while the pressure was maintained.

The multi-ply composite was characterized according to its density, polyimide content, volume proportion of fibers, and voids content. The polyimide content was the same as that of the original prepreg, which did not change since resin squeeze-out was kept to zero. The volume percent of fibers and resin was calculated as follows:

$$\text{Vol. \% of fibers} = \frac{\text{weight \% fibers}}{\text{fiber density}} \times \text{composite density}$$

$$\text{Vol. \% of resin} = \frac{\text{weight \% resin}}{\text{resin density}} \times \text{composite density}$$

The voids content was calculated as $$\text{Voids, \%} = 100 - (\text{Vol. \% fibers} + \text{Vol. \% resin})$$

The results of these experiments are given in Table V, below. In all runs pyromellitic diethyl ester diacid and a diamine or a mixture of diamines were the polyimide precursors. In the table, 1,3-bis(3-aminophenoxy)benzene is abbreviated to 1,3-bis-APB; bis-4,4'-APPP has the same meaning as in Example 8; N-methyl-2-pyrrolidone is abbreviated to NMP, ethanol to EtOH, and methanol to MeOH. In runs e and k excess diamine was capped with phthalic anhydride. In the other runs, any excess reactant present was uncapped.

TABLE V

| Run | Diamine and Solvent | PMDE/diamine mole ratio | Composite density g/cm³ | % resin | vol. % fibers | % voids | Flexural Strength MPa 23° C. | Flexural Modulus GPa |
|---|---|---|---|---|---|---|---|---|
| a | 1,3-bis-APB; NMP/EtOH 3/1 | 1/1.08 | 1.63 | 34 | 60 | 1 | 735 | 64.1 |
| b | bis-4,4'-APPP/1,3-bis-APB 25/75*; NMP/EtOH 3/1 | 1/1.08 | 1.61 | 34 | 59 | 1 | 659 | 66.4 |
| c | 1,3-bis-APB; NMP/EtOH 3/1 | 1.05/1 | 1.58 | 34 | 58 | 2.6 | 797 | 66.2 |
| d | bis-4,4'-APPP/1,3-bis-APB 25/75*; NMP/EtOH 3/1 | 1/1 | 1.54 | 34 | 56 | 5.3 | 496 | 58.6 |

TABLE V-continued

| Run | Diamine and Solvent | PMDE/ diamine mole ratio | Composite density g/cm³ | % resin | vol. % fibers | % voids | Flexural Strength MPa 23° C. | Flexural Modulus GPa |
|---|---|---|---|---|---|---|---|---|
| e | 1,3-bis-APB; NMP/EtOH 3/1 | 1/1.05** | 1.64 | 31 | 63 | 1 | 583 | 70.4 |
| f | 1,3-bis-APB; NMP/EtOH 3/1 | 1.08/1 | 1.60 | 32 | 60 | 1.8 | 870 | 65.2 |
| g | 1,3-bis-APB; EtOH | 1/1.05 | 1.63 | 32 | 62 | 1 | 948 | 66.2 |
| h | 1,3-bis-APB; diglyme | 1/1.05 | 1.62 | 32 | 61 | 1.2 | 900 | 66.8 |
| i | 1,3-bis-APB; MeOH | 1/1.05 | 1.61 | 33 | 60 | 1.2 | 794 | 60.3 |
| j | 1,3-bis-APB; NMP | 1/1.05 | 1.61 | 32 | 61 | 1.4 | 814 | 65.4 |
| k | 1,3-bis-APB; NMP/EtOH 3/1 | 1/1.07 | 1.63 | 32 | 62 | 1 | 832 | 69.3 |

*mole %
**capped with phthalic ethyl ester acid

EXAMPLE 11

Preparation of Non-stoichiometric Polyimides

Using the technique of Example 2 polyimides were prepared by adding pyromellitic dianhydride to diamine solution in DMAc, as shown in Table VI. The resulting solution was stored at room temperature for at least 3 hours, and then phthalic anhydride was added as shown in Table VI. After additional 16 hours at room temperature, the resin was isolated. The resin was heated 2 hours to 280° C. to complete the devolatilization process. Films were compression molded for 1-2 minutes under a pressure of about 2.1 MPa at the indicated temperature. Table VI also provides tensile property data obtained according to ASTM D-882-A as well as melt index values obtained as described in Example 7. Quantities of all the chemical compounds are given in moles.

TABLE VI

| Run | a | b | c |
|---|---|---|---|
| 1,3-bis(3-aminophenoxy)benzene | 0.104 | 0.105 | 0.013 |
| 2,2-bis[4-(4-aminophenoxy)phenyl]propane | — | — | 0.039 |
| Pyromellitic Anhydride | 0.100 | 0.100 | 0.050 |
| N,N—Dimethylacetamide | 2.655 | 2.651 | 1.787 |
| Phthalic Anhydride | 0.008 | 0.010 | 0.004 |
| Inh. Visc. of Polyamide Acid at room temp. | 0.75 | 0.57 | 0.67 |
| Melt Index (g/10 min) at 360° C. | 0.5 | 8.2 | — |
| 390° C. | — | — | 0.7 |
| Tensile Modulus, MPa | 2266 | 2579 | 2079 |
| Tensile Stress at Yield, MPa | 106 | 101 | 74 |
| Strain at Break, % | 9.9 | 7.2 | 5.6 |
| Compression Molding Temperature, °C. | 360 | 360 | 390 |

EXAMPLE 12

Preparation of a Polyimide Precursor Solution

Into a 500 mL 3-neck round bottom flask equipped with a mechanical stirrer and a thermometer there was added 39 mL of absolute ethanol, 25 mL of N-methyl-2-pyrrolidone and 65.4 g (0.3 mole) of pyromellitic dianhydride. The dianhydride was washed in with additional 80 mL of N-methyl-2-pyrrolidone. The slurry was heated to 60°-65° C. for 1 hour in order to convert the pyromellitic dianhydride to diethyl ester diacid. Into the resulting homogeneous solution there was added 92.0 g (0.315 mole, 5% excess) of 1,3-bis(3-aminophenoxy)benzene, followed by 30 mL of N-methyl-2-pyrrolidone to wash in the diamine. The diamine went into solution almost immediately. The solution was then filtered through a 60 mesh screen to remove particulate contamination. The resulting solution had a Brookfield viscosity of 4.2 poises at 25° C. The cured resin solids content was found to be 44.8% (theoretical=45.0%). The cured resin solids were determined by accurately weighing 5-10 g of precursor solution into a small aluminum weighing dish, heating for 2 hours at 225° C., followed by 30 minutes at 375° C., and then reweighing the solid residue.

EXAMPLE 13

Unidirectional Tape Preparation

Unidirectional, 5.1 cm wide tape was made by impregnating "Magnamite" AS-4 (Hercules, Inc.) graphite fibers with a concentrated precursor solution in N-methyl-2-pyrrolidone containing about 65% polyimide (on a cured resin solids basis) based on pyromellitic diacid diethyl ester and a 5% excess of a 25:75 mole % mixture of 2,2-bis-[4-(4-aminophenoxy)phenyl]propane with 1,3-bis(3-aminophenoxy)benzene. The tape had a cured solids content of 32.98% and volatiles content of 14.2%, the remainder being graphite fiber. The tape was passed through a tube and heated with a stream of hot air, where the tape reached a temperature of 400° C. and had a residence time of 29 seconds. This rapid heat treatment substantially devolatilized the tape, leaving only 0.14%, as measured at 375° C. by thermogravimetric analysis. The Tg was found by thermal mechanical analysis to be 212° C.

Such thermoplastic tape can be consolidated to a virtually void-free material by heating it under pressure and is useful for automatic lay-up and fabrication of composite articles.

We claim:

1. A substantially void-free composite structure consisting essentially of a fibrous substrate impregnated with a melt-fusible polyimide containing up to about 10% of end-capped amino or anhydride groups and consisting essentially of the following repeating units:

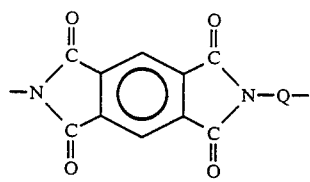

where Q in each repeating unit, independently of any other unit, is a divalent organic radical selected from the following:

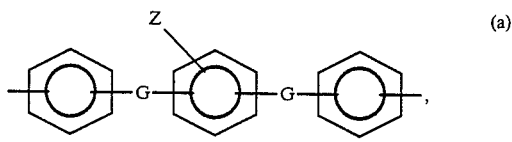

where G is O or S; and Z is hydrogen or phenyl; and, when Z is hydrogen, both terminal covalent bonds are either in the ortho or meta position with respect to G; while, when Z is phenyl, both terminal covalent bonds are in ortho, meta, or para position with respect to G;

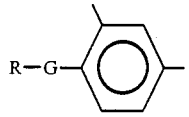
(b)

where G is O or S; and R is phenyl, biphenyl, or naphthyl; and

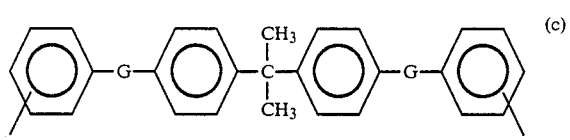
(c)

where G is O or S.

2. A composite structure of claim 1 wherein G in each repeating unit Q is O.

3. A composite of claim 2 wherein Q is a divalent radical remaining on removal of the amino groups from the diamine: $H_2N-Q-NH_2$ selected from the group consisting of:
   1,3-bis(2-aminophenoxy)benzene,
   1,2-bis(3-aminophenoxy)benzene,
   1,2-bis(2-aminophenoxy)benzene,
   1,3-bis(3-aminophenoxy)benzene,
   1,4-bis(3-aminophenoxy)benzene,
   1,4-bis(2-aminophenoxy)benzene,
   2,4-diaminodiphenyl ether,
   1-(2,4-diaminophenoxy)naphthalene,
   2-(2,4-diaminophenoxy)naphthalene,
   2-(2,4-diaminophenoxy)biphenyl,
   4-(2,4-diaminophenoxy)biphenyl,
   2,2-bis[4-(4-aminophenoxy)phenyl]propane,
   1,4-bis(4-aminophenoxy)-2-phenylbenzene,
   2,2-bis[4-(2-aminophenoxy)phenyl]propane, and
   2,2-bis[4-(3-aminophenoxy)phenyl]propane.

4. A composite of claim 3 wherein $H_2N-Q-NH_2$ is selected from the group consisting of:
   1,3-bis(3-aminophenoxy)benzene,
   1,3-bis(2-aminophenoxy)benzene,
   1,4-bis(3-aminophenoxy)benzene,
   1,4-bis(4-aminophenoxy)-2-phenylbenzene,
   2,2-bis[4-(4-aminophenoxy)phenyl]propane, and
   2-(2,4-diaminophenoxy)biphenyl.

5. A composite of claim 4 wherein the repeating unit of the polyimide is of two types, $H_2N-Q-NH_2$ for one type being 1,3-bis(3-aminophenoxy)benzene and for the other type 2,2-bis[4-(4-aminophenoxy)phenyl]propane, both types being present.

6. A composite structure which is a substantially void-free prepreg consisting essentially of a fibrous substrate impregnated with a concentrated solution of a polyamide acid, which is a precursor of a melt-fusible polyimide, the volatiles content of the prepreg being at most about 25% of its total weight, the melt-fusible polyimide which can be obtained by heating the precursor to a sufficiently high temperature consisting essentially of the following repeating units:

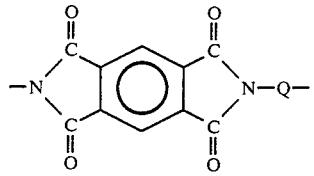

where Q in each repeating unit, independently of any other unit, is a divalent organic radical selected from the following:

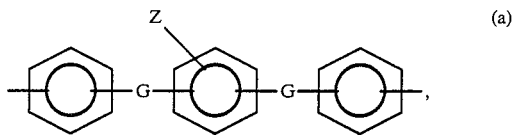
(a)

where G is O or S, and Z is hydrogen or phenyl; and, when Z is hydrogen, both terminal covalent bonds are either in the ortho or meta position with respect to G; while, when Z is phenyl; both terminal covalent bonds are in ortho, meta, or para position with respect to G;

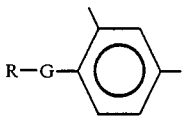
(b)

where G is O or S; and R is phenyl, biphenyl, or naphthyl; and

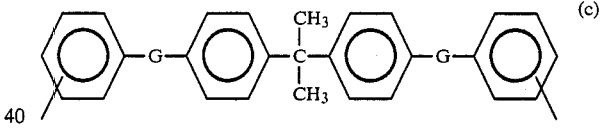
(c)

where G is O or S.

7. A composite structure of claim 6 wherein G in each repeating unit Q is O.

8. A prepreg of claim 6 wherein Q is a divalent radical remaining on removal of the amino groups from a diamine $H_2N-Q-NH_2$ selected from the group consisting of:
   1,3-bis(2-aminophenoxy)benzene,
   1,2-bis(3-aminophenoxy)benzene,
   1,2-bis(2-aminophenoxy)benzene,
   1,3-bis(3-aminophenoxy)benzene,
   1,4-bis(3-aminophenoxy)benzene,
   1,4-bis(2-aminophenoxy)benzene,
   2,4-diaminodiphenyl ether,
   1-(2,4-diaminophenoxy)naphthalene,
   2-(2,4-diaminophenoxy)naphthalene,
   2-(2,4-diaminophenoxy)biphenyl,
   4-(2,4-diaminophenoxy)biphenyl,
   2,2-bis[4-(4-aminophenoxy)phenyl]propane,
   2,2-bis[4-(3-aminophenoxy)phenyl]propane,
   2,2-bis[4-(2-aminophenoxy)phenyl]propane
   1,4-bis(4-aminophenoxy)-2-phenylbenzene.

9. A prepreg of claim 8, wherein the repeating unit of the polyimide is of two types, $H_2N-Q-NH_2$ for one type being 1,3-bis(3-aminophenoxy)benzene and for the other type 2,2-bis[4-(4-aminophenoxy)phenyl]propane, both types being present.

10. A composite structure selected from the composites of any one of the claims 1–9 and prepregs of any of the claims 6–9, wherein the fibrous substrate is a preformed woven, non-woven, or felted material.

11. A composite structure of claim 10 wherein the fibrous substrate is in the form of unidirectional continuous fibers.

12. A composite structure of any one of the claims 1–11, wherein the fibrous substrate is selected from the group consisting of carbon, aramid, glass, boron, and asbestos fibers.

13. A composite structure of any one of the claims 1–12 wherein the fiber content is about 40–65 volume percent.

14. A composite structure of any one of the claims 1–13, which is in tape form.

15. A shaped article formed from any one of the composite structures of claims 1–14.

16. A melt-fusible polyimide consisting essentially of the following repeating units

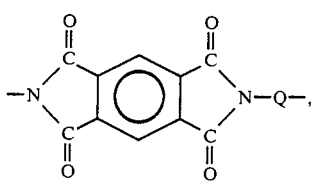

where Q in each repeating unit, independently of any other unit, is a divalent organic radical selected from the following:

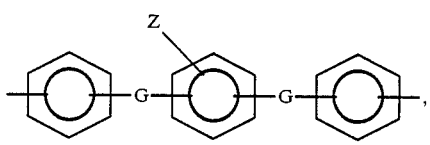
(a)

where G is O or S, and Z is hydrogen or phenyl; and, when Z is hydrogen, both terminal covalent bonds are either in the ortho or meta position with respect to G; while, when Z is phenyl, both terminal covalent bonds are in ortho, meta, or para position with respect to G;

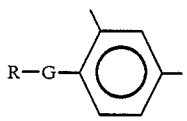
(b)

where G is O or S; and R is phenyl, biphenyl, or naphthyl; and

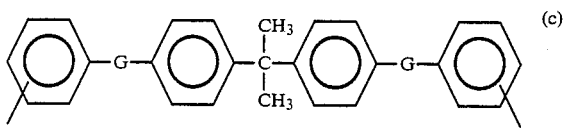
(c)

where G is O or S and both terminal covalent bonds are in the ortho or meta position with respect to G.

17. A polyimide of claim 16 wherein G in each repeating unit Q is O.

18. A polyimide of claim 17, wherein Q is the radical remaining on removal of the amino groups from a diamine $H_2N-Q-NH_2$ selected from the group consisting of:

1,3-bis(2-aminophenoxy)benzene,
1,2-bis(3-aminophenoxy)benzene,
1,2-bis(2-aminophenoxy)benzene,
1,4-bis(3-aminophenoxy)benzene,
1,4-bis(2-aminophenoxy)benzene,
1,3-bis(3-aminophenoxy)benzene,
2,4-diaminodiphenyl ether,
1-(2,4-diaminophenoxy)naphthalene,
2-(2,4-diaminophenoxy)naphthalene,
2-(2,4-diaminophenoxy)biphenyl,
4-(2,4-diaminophenoxy)biphenyl,
1,4-bis(4-aminophenoxy)-2-phenylbenzene, and
2,2-bis[4-(2-aminophenoxy)phenyl]propane.

19. A polyimide of claim 18 wherein Q is the radical remaining on removal of the amino groups from a diamine $H_2N-Q-NH_2$ selected from the group consisting of:

1,3-bis(3-aminophenoxy)benzene,
1,3-bis(2-aminophenoxy)benzene,
1,4-bis(3-aminophenoxy)benzene,
1,4-bis(4-aminophenoxy)-2-phenylbenzene,
2,2-bis[4-(2-aminophenoxy)phenyl]propane, and
2-(2,4-diaminophenoxy)biphenyl.

20. A polyimide of claim 19, wherein the repeating unit is of two types, $H_2N-Q-NH_2$ for one type being 1,3-bis(3-aminophenoxy)benzene and for the other type being 2,2-bis[4-(4-aminophenoxy)-phenyl]propane, both types being present.

21. A polyimide of claim 17 which contains an excess of up to 10% of diamine $H_2N-Q-NH_2$.

22. A polyimide of claim 21 wherein the excess of diamine is end-capped.

23. A polyimide of claim 17 which contains an excess of up to 10% of pyromellitic dianhydride.

24. A polyimide of claim 23 wherein the excess of dianhydride is end-capped.

25. A polyimide of claim 17 which is melt-processible.

26. An article obtained by extruding, compression-molding, or injection-molding a polyimide of claim 25.

27. A monofilament or fiber made from a polyimide of claim 25.

28. A polyimide of any one of the claims 16–25 which has reversible crystallinity.

29. A film of a polyimide of any one of the claims 16–25.

30. A polyimide composition comprising a polyimide of claim 16 containing a reinforcing additive in fiber or particulate form.

31. A polyimide composition of claim 30, wherein the volume proportion of reinforcing additive is 5–70%.

32. A composition of claim 31 wherein the volume proportion of reinforcing additive is 5–50%.

33. A composition of claim 32 wherein the volume proportion of reinforcing additive is 5–25%.

34. A solution in a polar solvent of a pyromellitic diester diacid and of a diamine, either component being present in a 0–10% molar excess, the diamine being either a single species or more than one species selected from the following classes (a) through (c):

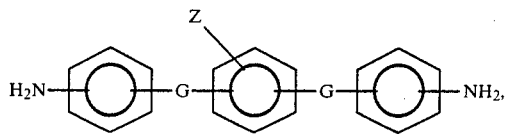

where G is O or S, and Z is hydrogen or phenyl; and, when Z is hydrogen, both terminal amine groups are either in the ortho or meta position with respect to G; while, when Z is phenyl, both terminal amine groups are in ortho, meta, or para position with respect to G;

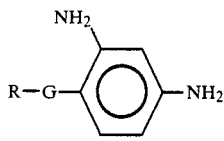

where G is O or S; and R is phenyl, biphenyl, or naphthyl; and

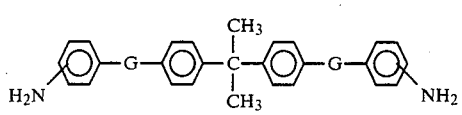

where G is O or S, and both amine groups are in the ortho or meta position with respect to G.

35. A solution of claim 34 wherein G in each repeating unit Q is O.

36. A solution of claim 35 wherein the diamine is selected from the group consisting of:
1,3-bis(2-aminophenoxy)benzene,
1,2-bis(3-aminophenoxy)benzene;
1,2-bis(2-aminophenoxy)benzene,
1,3-bis(3-aminophenoxy)benzene,
1,4-bis(3-aminophenoxy)benzene,
1,4-bis(2-aminophenoxy)benzene,
2,4-diaminodiphenyl ether,
1-(2,4-diaminophenoxy)naphthalene,
2-(2,4-diaminophenoxy)naphthalene,
2-(2,4-diaminophenoxy)biphenyl,
4-(2,4-diaminophenoxy)biphenyl,
2,2-bis[4-(4-aminophenoxy)phenyl]propane,
2,2-bis[4-(3-aminophenoxy)phenyl]propane,
2,2-bis[4-(2-aminophenoxy)phenyl]propane, and
1,4-bis(4-aminophenoxy)-2-phenylbenzene.

37. A solution of claim 36 wherein two diamines are present, one diamine being 1,3-bis(3-aminophenoxy)benzene and the other 2,2-bis[4-(4-aminophenoxy)phenyl]propane.

38. A composite structure which is a substantially void-free prepreg consisting essentially of a fibrous substrate impregnated with a concentrated solution of claim 34, the volatiles content of the prepreg being at most about 25% of its total weight.

39. A composite structure which is a substantially void-free prepreg consisting essentially of a fibrous substrate impregnated with a concentrated solution of claim 36 the volatiles content of the prepreg being at most about 25% of its total weight.

40. A composite structure which is a substantially void-free prepreg consisting essentially of a fibrous substrate impregnated with a concentrated solution of claim 37, the volatiles content of the prepreg being at most about 25% of its total weight.

41. A diamine selected from the class consisting of:
1,4-bis(4-aminophenoxy)-2-phenylbenzene;
2-(2,4-diaminophenoxy)biphenyl; and
4-(2,4-diaminophenoxy)biphenyl.

42. A diamine of claim 41 which is 1,4-bis(4-aminophenoxy)-2-phenylbenzene.

43. A diamine of claim 41 which is 2-(2,4-diaminophenoxy)biphenyl.

44. A diamine of claim 41 which is 4-(2,4-diaminophenoxy)biphenyl.

* * * * *